R. R. VALE.
VEHICLE WHEEL.
APPLICATION FILED JAN. 31, 1921. RENEWED MAY 4, 1922.
1,419,329.
Patented June 13, 1922.
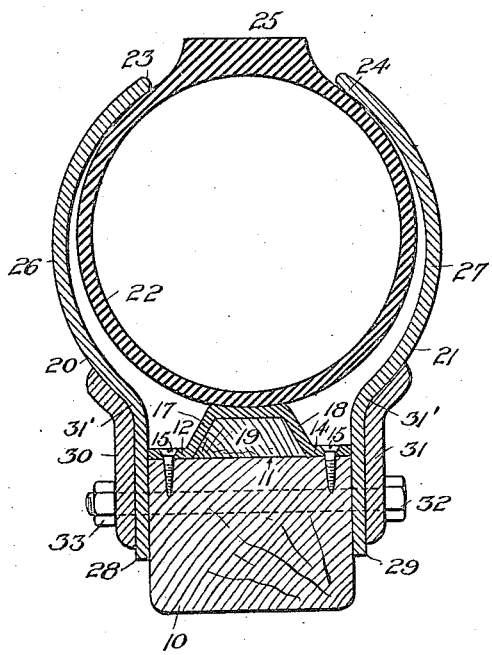
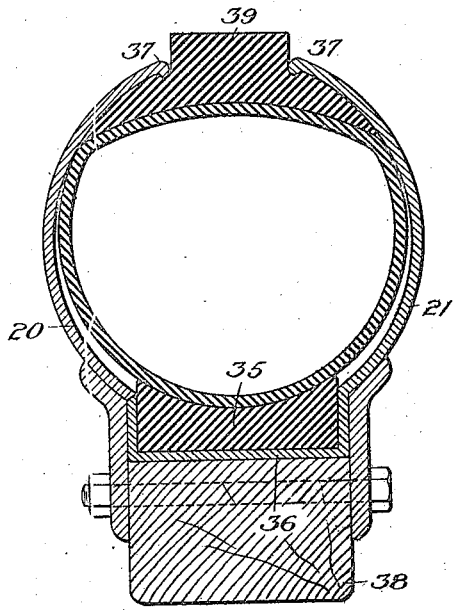
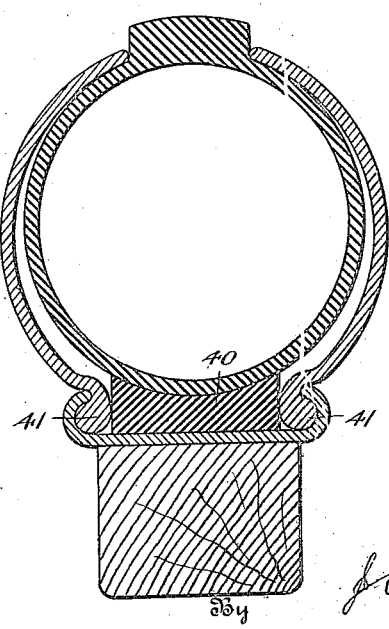
Inventor
Ruby R. Vale
By Josiah M. Vale
His Attorney

UNITED STATES PATENT OFFICE.

RUBY R. VALE, OF MILFORD, DELAWARE.

VEHICLE WHEEL.

1,419,329.  Specification of Letters Patent.  Patented June 13, 1922.

Application filed January 31, 1921, Serial No. 441,343. Renewed May 4, 1922. Serial No. 558,426.

*To all whom it may concern:*

Be it known that I, RUBY R. VALE, a citizen of the United States, residing at Milford, in the county of Sussex and State of Delaware, have invented certain new and useful Improvements in Vehicle Wheels; and I do hereby declare the following to be a full, clear, and exact description of the same, reference being had to the accompanying drawings, forming part of this specification.

The present invention relates to pneumatic tires for vehicles, particularly automobiles, and to the securing means whereby such tires are held in place on the felly or to the rim.

The principal object of the present invention lies in the provision of a structure wherein the air chamber rests upon a cradle permanently secured to the felly or rim so that the sides of the air chamber are free and in the means whereby the air chamber is secured to the wheel by being attached or held only at a line or surface closely adjacent to the tread of the tire which may be an integral part of the air chamber or a separate and detachable part superimposed thereon.

A further purpose of the invention lies in the provision of an elevated base which forms a cradle for the air chamber of the tire whereby a free and easy expansion and contraction of the air chamber is permitted, acting in synchronism with the movement of the load as a point on the air chamber approaches, comes in contact with, and finally leaves the point of ground contact; this freedom of expansion and contraction greatly increasing the length of life of the tire as well as permitting the use of a softer and more flexible air chamber casing.

Other purposes of the invention will be apparent from the following description in detail and also from the claims at the end of this specification, the principal one of further objects including the provision of side arcs of stiff, durable, and non-elastic material of sufficient tensile strength to serve as a container for the air chamber and to keep it in constant position, such side arcs being of considerably greater cross sectional diameter than the air chamber casing. These side arcs have a two-fold purpose, namely, first, to hold the air chamber in a secure and constant position free from side sway or motion of any nature except downward or toward the axis in accordance with the inward pressure of the load, and, secondly, to serve as a protection to the air chamber shielding it from danger of puncture.

In practically all of the present day tires the casing is provided with either a stiff clincher bead or a straight side bead and the tire is attached to the rim by means of these beads and a tight engaging connection with the flange or rim so that the casing is secured to the rim at the point of the greatest strain, that is, the base of the casing which always sustains at the point of ground contact the constant outward pressure of the air as well as the variable inward pressure of the load as it approaches, comes in contact with, and leaves such point of ground contact. The present day tire, therefore, is subject to a destructive hinge-like motion of the side portions of the casing which necessarily results in rim cutting and blow-outs.

By means of the structure herein described and illustrated, a vehicle tire is produced which includes a pneumatic tire with detachable puncture proof tread and side arcs attaching to the rim, the reverse of or opposite to tires of present construction, at least those in general use. The present structure is fundamentally different from all tires with which I am familiar, thus permitting the obviating of the objections just noted, since in the tire herein described, the air chamber casing simply rests upon the cradle or raised portion of the rim and it is not in contact with the sides of the base of the rim, but is held in close contact with the outer peripheral edge of each of the metal side arcs.

Figure 1 is a cross section through a preferred form of my device.

Fig. 2 is a similar view of a modification.

Fig. 3 is a similar view of a further modification.

The felly of the wheel is represented at 10. Its upper surface follows the contour of the cradle band with its elevated base as later described, or is of the usual type having an upper flat surface 11 upon which rests the outer and inner edges 12 and 14 of the cradle member which may be secured to the felly or rim in any desired manner, as for example, by screws 15 which serve merely to prevent creeping of the cradle band which is preferably of metal and has as an essential part an elevated base 16 concave on top as shown and having beveled sides 17 and 18 merging into the edge portions 12 and 14. An annular member 19 preferably of wood fits the depression in the cradle band caused by the elevated base 16 and the side portions 17 and 18, if the upper surface of the felly is not itself so shaped as to follow such contour, so as to strengthen and support the cradle member and to permit of its being made of relatively thin sheet material.

The side members 20 and 21 are each formed of a single piece of metal or of any stiff durable and non-elastic material having sufficient strength to serve for a container for the air chamber 22 and to retain it in contact with the elevated base 16 by pressure exerted against the air chamber casing by the peripheral edges 23 and 24 which engage the casing on either side of the heavier and tougher tread portion 25 of the air chamber. Each of the side arcs 20 and 21 has a central bowed portion 26 and 27 and a flat flange 28 and 29 respectively adapted to lie flat against the side of the felly 10. If desired the inner side portion 21 may be integral with the edge portion 14 of the cradle band in which case the flange 29 may be omitted and as a matter of fact both of the side portions may be integral with the cradle band if so desired but this necessitates the hinging of the outer member 20 to permit the ready removal of the tire or air chamber. The form illustrated in Figure 1 is the preferred form as it enables the easy manufacture of the parts and the two side parts are interchangeable.

A pair of rings 30 and 31 are provided which closely fit the side portions and strengthen and support the same at the relatively sharp angle 31 and also serve to receive the bolts 32 which pass through the two rings the two flanges and the felly, being held in place by the usual nuts 33.

While I have shown my wheel in its preferred form, I wish it distinctly understood that material changes may be made in the structure without departing from the spirit of the invention which is to be considered as limited only as called for in the claims. For example, the side arcs 20 and 21 may be positively connected to the air chamber or tread casing if desired, for example, as described in my application No. 390,794, filed June 2, 1920, in Figure 2 herein shown or in a similar manner.

In Figure 2, I have shown a modification of my device wherein the annular member 19 and the cradle band have been replaced by a simple annulus, 35 of rubber, rectangular in cross section with concave top surface upon which the air chamber rests, and itself resting on the flat periphery of the base 36 which is integral with the side arcs and which in turn rests upon the flat periphery of the felly 38. In this modification the side arcs 20 and 21 are shown as positively locking at their peripheral edges 37 with the material of the detachable tread 39 which is superimposed upon but is not an integral part of the air chamber.

In this modification also the side arcs and base 36 on which the annulus rests are integral and therefore the outer side arc 20 must be hinged, a flexible metal rope with screw buckle must follow its curved peripheral outer edge in order to give the side arc fixity of position.

Since it is intended that the annulus should be used merely as a substitute for the cradle shown in Fig. 1, Fig. 3 is shown as another modification by employing such annulus 40 of rubber, wood, fiber or metal in place of the annular member 19 and the cradle band of Fig. 1, with the side arcs attached by interlocking flange 41 to the base of the ordinary wire or disc wheel rim, and functioning in the same manner as in the preferred construction. The general purpose of both the annulus and annular band and cradle is the same, namely, to prevent the destructive hinge-like motion of the side portions of the tire and to place the stress at the proper point, namely, in a line close to the tread portion of the tire rather than in a line in close proximity to the clincher rim as is the case with the modern construction of tires.

What I claim is:

1. In combination, a supporting member, a cradle engaging said member at either edge thereof and having an elevated portion in the center, a tire resting on said cradle, and a plurality of side members spaced from said tire member except in proximity to the tread portion therof, and means for securing said side members to said supporting member.

2. In combination, a supporting member, an annular cradle engaging said member at either edge thereof and having an elevated portion in the center, and bowed tire engaging members secured at either side of said supporting member.

3. In a vehicle wheel, a felly supporting member, a tire and a cradle between said felly member and tire, said cradle consisting of a single stamping of sheet metal having a central elevated portion for engagement with said tire, and a pair of cylindrical portions to engage said supporting member.

4. In a vehicle wheel, a cradle member consisting of an annular band having a central channel therein to form an elevated base for engagement with the inner face of a tire.

5. In a vehicle wheel, a channeled cradle member, a plurality of side members adapted to engage a tire near its tread surface and to hold same in engagement with the raised portion of said channeled cradle, and a plurality of ring members for strengthening said side members and for securing same to the felly or rim of the wheel.

RUBY R. VALE.